O. C. CURRIE & W. A. GRUENBERG.
FOLDING MACHINE.
APPLICATION FILED SEPT. 18, 1916.

1,266,218.

Patented May 14, 1918.
12 SHEETS—SHEET 1.

Witness
E. J. Fairbain

Inventors
Otis C. Currie,
Walter A. Gruenberg.
By
Charles E. Wiser
Attorney

O. C. CURRIE & W. A. GRUENBERG.
FOLDING MACHINE.
APPLICATION FILED SEPT. 18, 1916.

1,266,218.

Patented May 14, 1918.
12 SHEETS—SHEET 3.

Inventors
OTIS C. CURRIE
WALTER A. GRUENBERG.

Witness

O. C. CURRIE & W. A. GRUENBERG.
FOLDING MACHINE.
APPLICATION FILED SEPT. 18, 1916.

1,266,218.

Patented May 14, 1918.
12 SHEETS—SHEET 4.

Inventors
OTIS C. CURRIE
WALTER A. GRUENBERG.

Witness

By Charles E. Wiener
Attorney

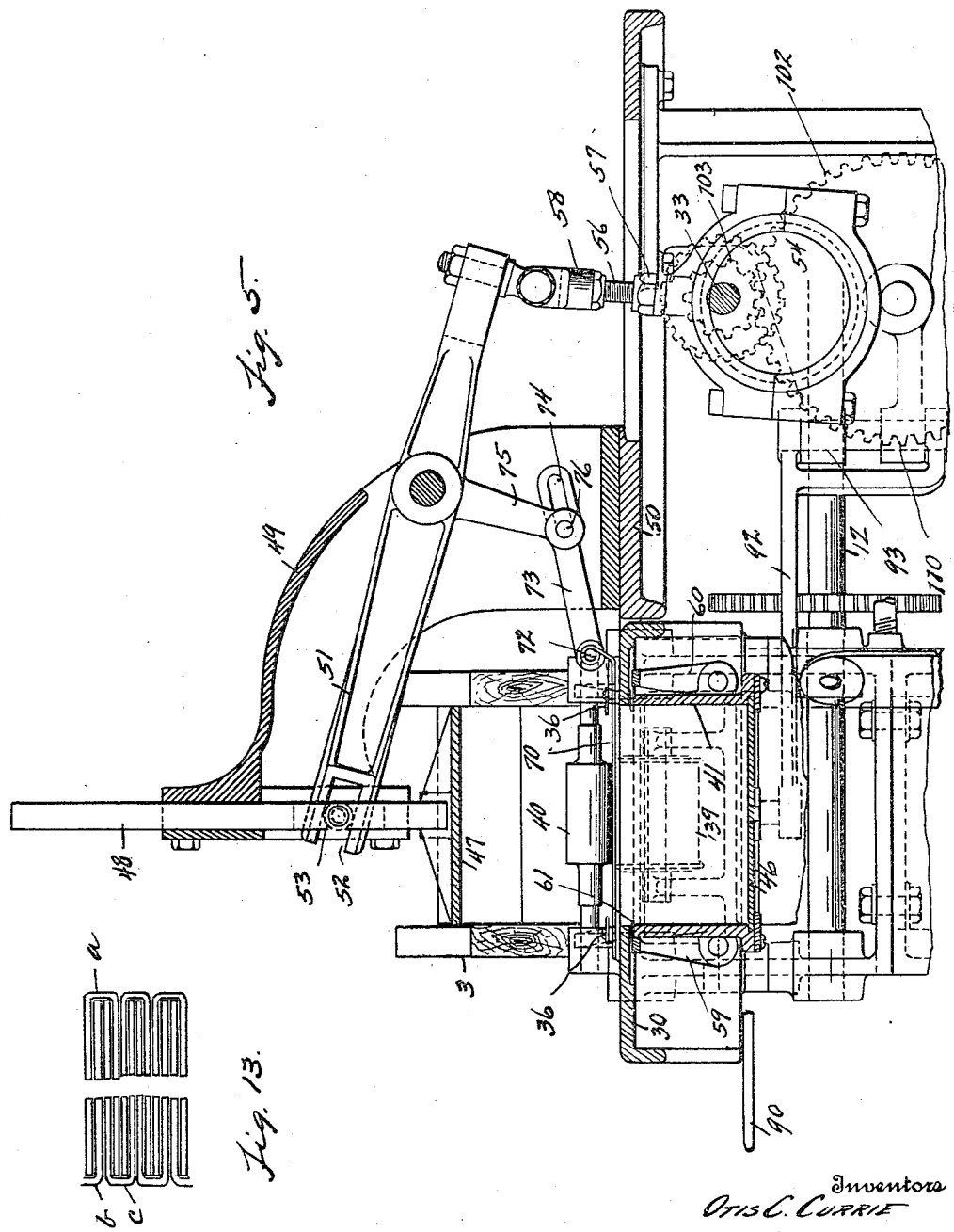

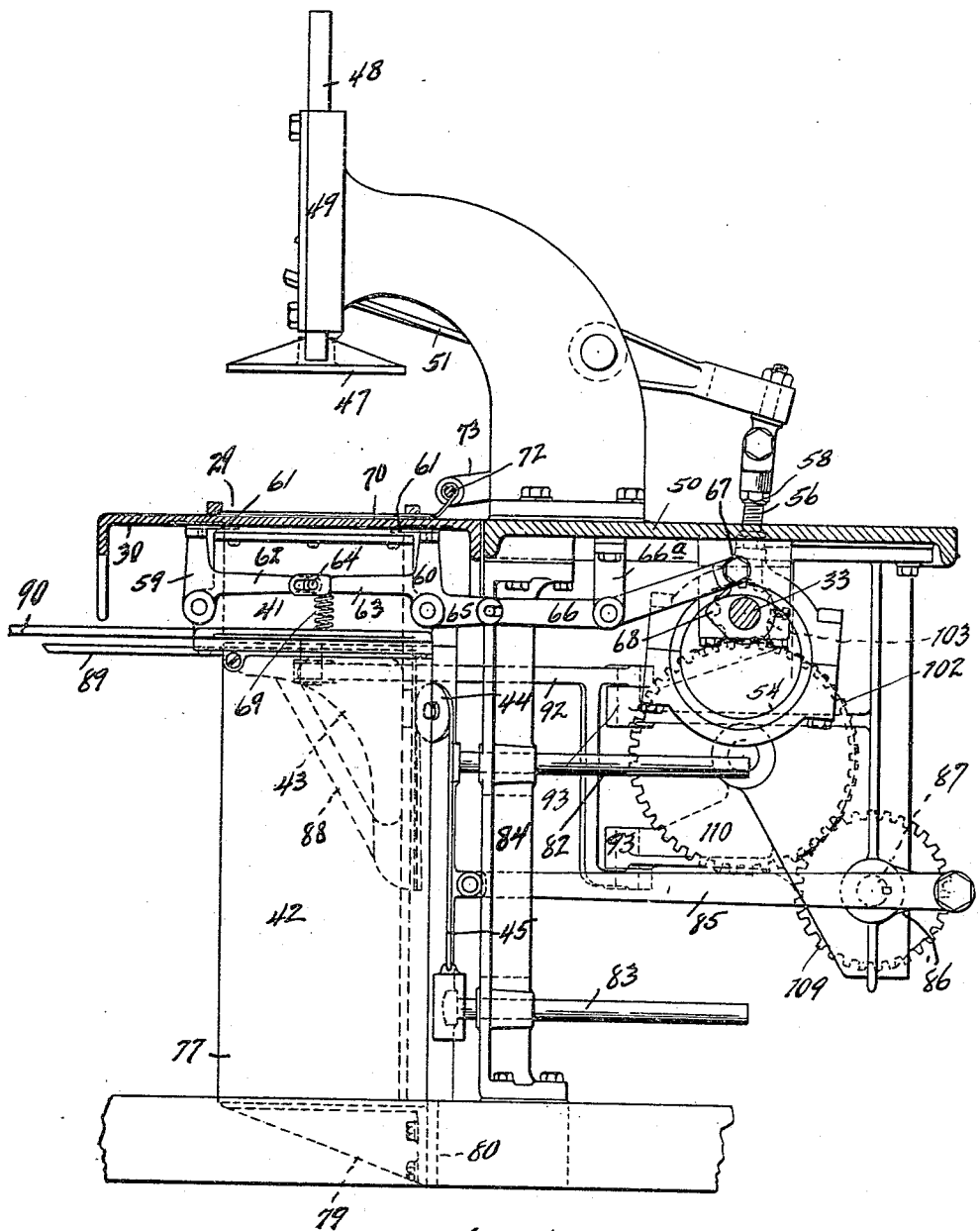

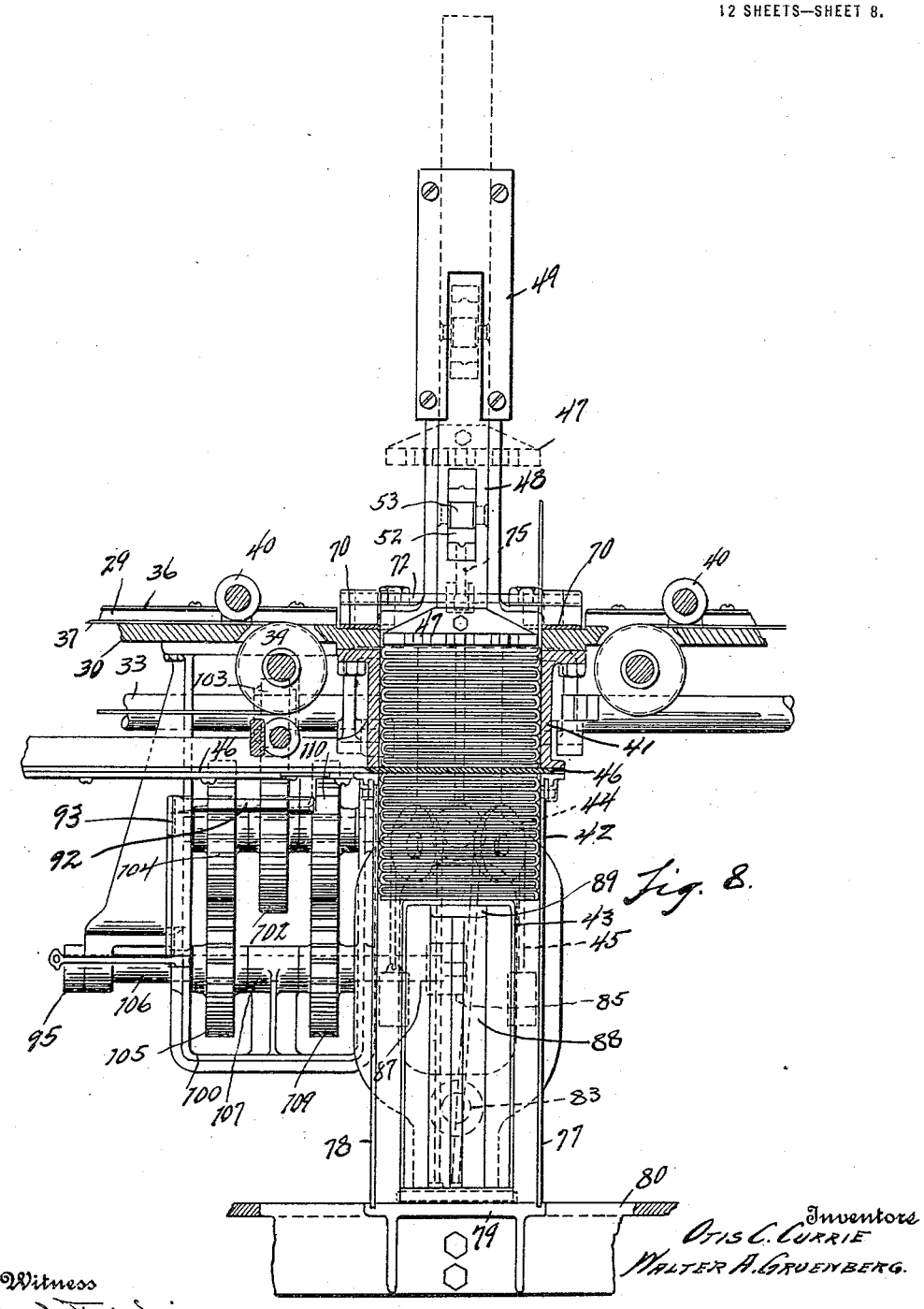

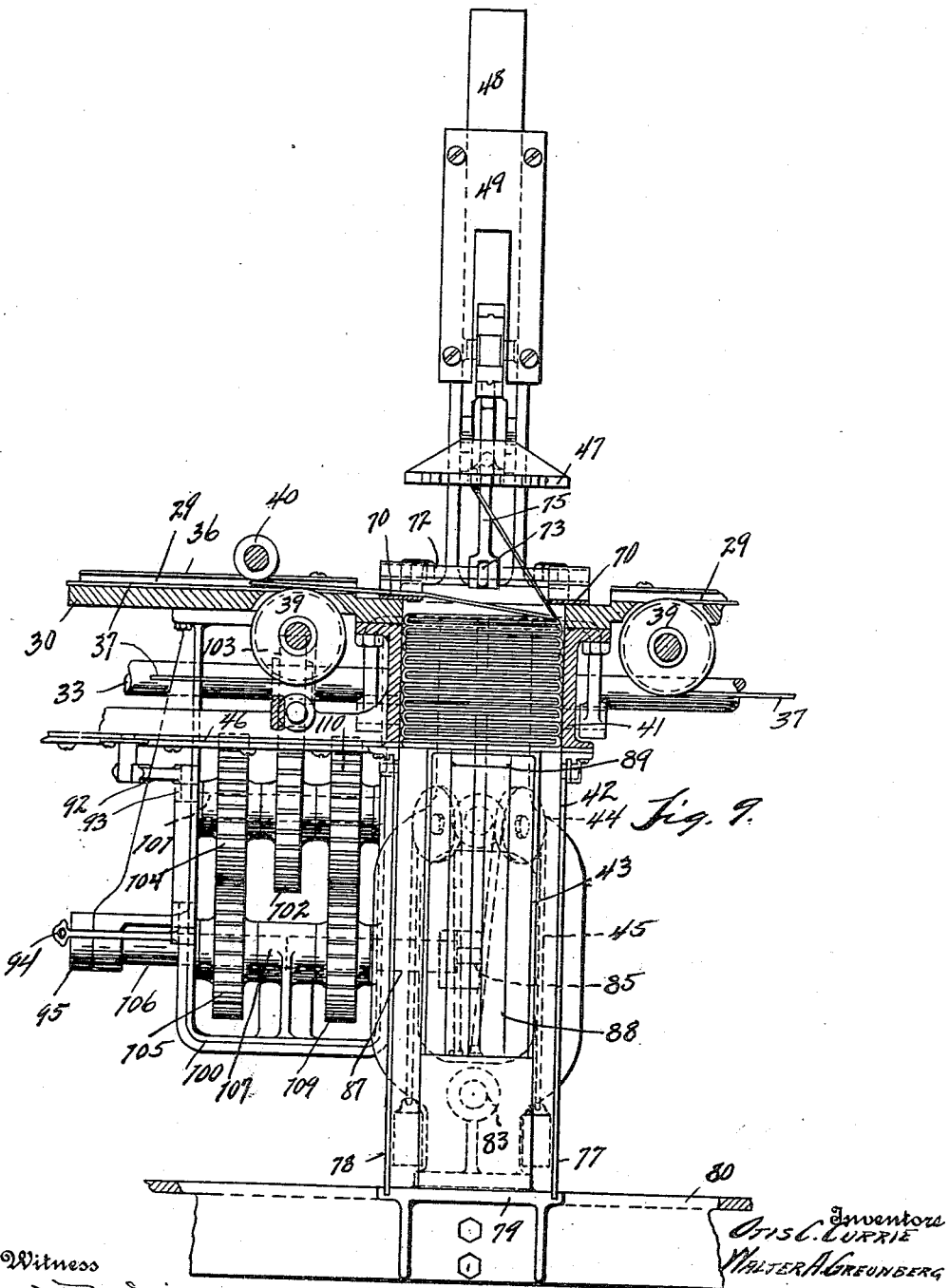

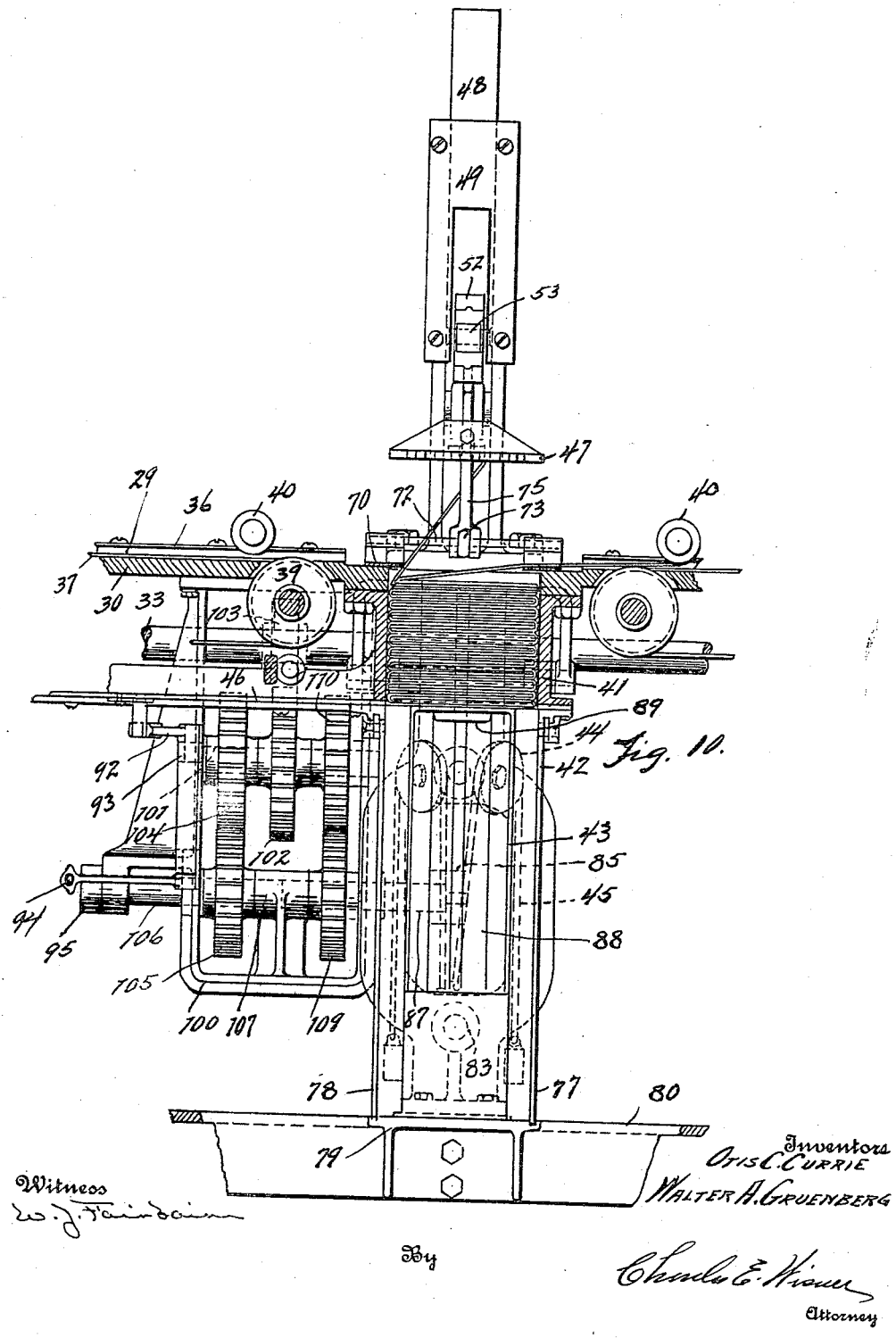

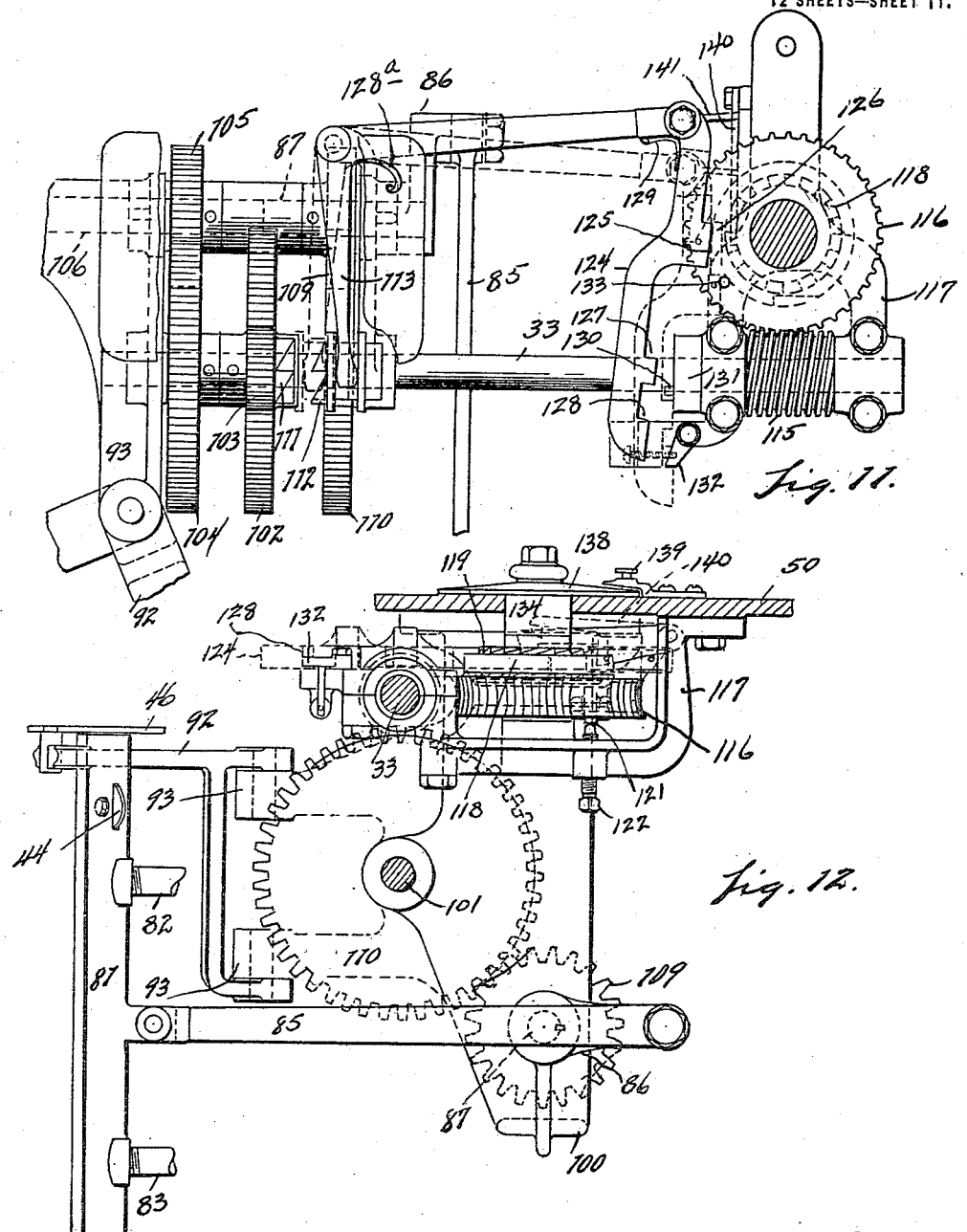

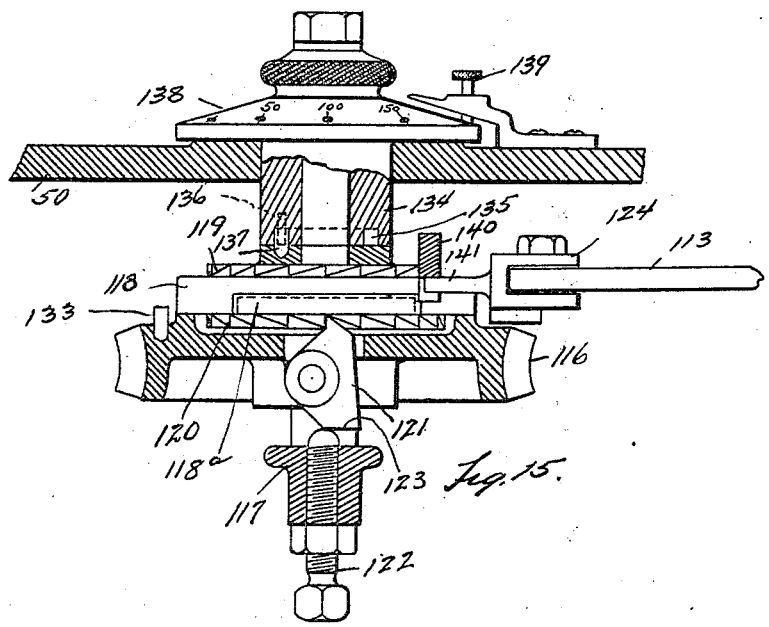
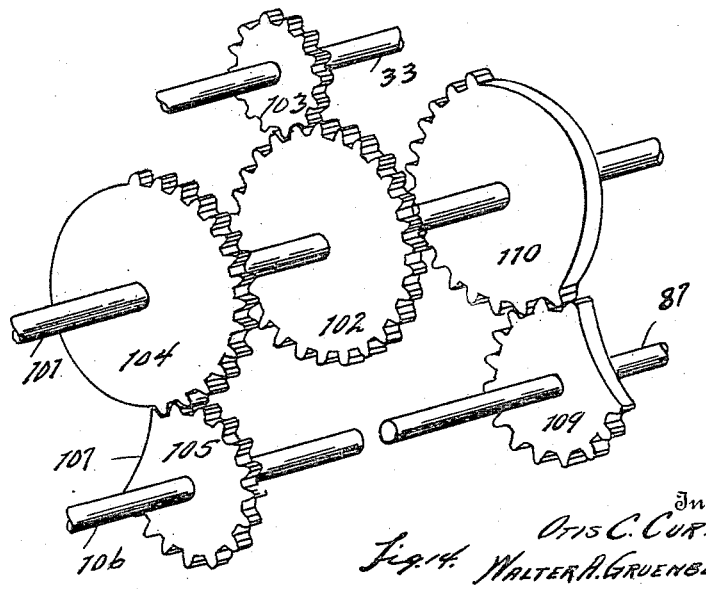

UNITED STATES PATENT OFFICE.

OTIS C. CURRIE AND WALTER A. GRUENBERG, OF DETROIT, MICHIGAN, ASSIGNORS TO WILLIAM O. ALBIG, OF ADRIAN, MICHIGAN.

FOLDING-MACHINE.

1,266,218.   Specification of Letters Patent.   Patented May 14, 1918.

Application filed September 18, 1916.   Serial No. 120,705.

*To all whom it may concern:*

Be it known that we, OTIS C. CURRIE and WALTER A. GRUENBERG, citizens of the United States, residing at Detroit, county of Wayne, State of Michigan, have invented a certain new and useful Improvement in Folding-Machines, and declare the following to be a full, clear, and exact description of the same, such as will enable others skilled in the art to which it pertains to make and use the same, reference being had to the accompanying drawings, which form a part of this specification.

This invention relates to folding machines and its primary object is a machine adapted to interfold envelops or sheets and deliver the interfolded envelops in a pack of predetermined quantity suitable for use in a dispensing device of the general nature disclosed in the pending application of William O. Albig, Serial No. 18669, filed April 2, 1915. Another object of the invention is a machine of the character stated adapted to automatically remove envelops from a stack and interleave or fold the same. A further object of the invention is involved in the means employed in setting the apparatus to deliver a pack of a predetermined quantity of interfolded envelops. Another object of the invention is a machine adapted to continuously interfold envelops as stated, and during the operation of folding and forming a pack to deliver the predetermined quantity of interfolded envelops while an additional object of the invention is involved in the interfolding mechanism. A further object of the invention is a machine adapted to remove an envelop alternately from two separate stacks, feed the removed envelops in alternate relation to the folding mechanism, interfold the same in a pack, and to cut out a predetermined portion of the interfolded pack and deliver the same.

These and other objects and the several novel features of the invention in its preferred form are hereinafter more fully described and claimed and shown in the accompanying drawings in which—

Fig. 4 is a vertical longitudinal section of the machine taken on lines B—B of Fig. 3.

Fig. 5 is an enlarged sectional view of the folding mechanism taken on line C—C of Fig. 3.

Fig. 6 is an enlarged sectional detail taken on line A—A of Fig. 3.

Fig. 8 is an enlarged detail in section taken through the folding mechanism and feed device showing an envelop partly folded.

Fig. 9 is a similar view showing a succeeding step in the folding operation of an envelop and the means employed for inserting a succeeding envelop in foldable relation therewith.

Fig. 10 is a succeeding step showing the folding of the last inserted envelop and insertion of a succeeding envelop from the opposite side.

Fig. 11 is an enlarged plan view of the mechanism embodied in predetermining the size of the pack that is to be removed from the machine.

Fig. 12 is an elevation partly in section of said mechanism.

Fig. 13 shows several interfolded envelops.

Fig. 14 is a detail of the train of mutilated gears for operating the knife and discharge mechanism.

Fig. 15 is a vertical section of the mechanism for predetermining the operation of the knife and discharge mechanism.

Similar characters refer to similar parts throughout the drawing and specification.

Figure 1:
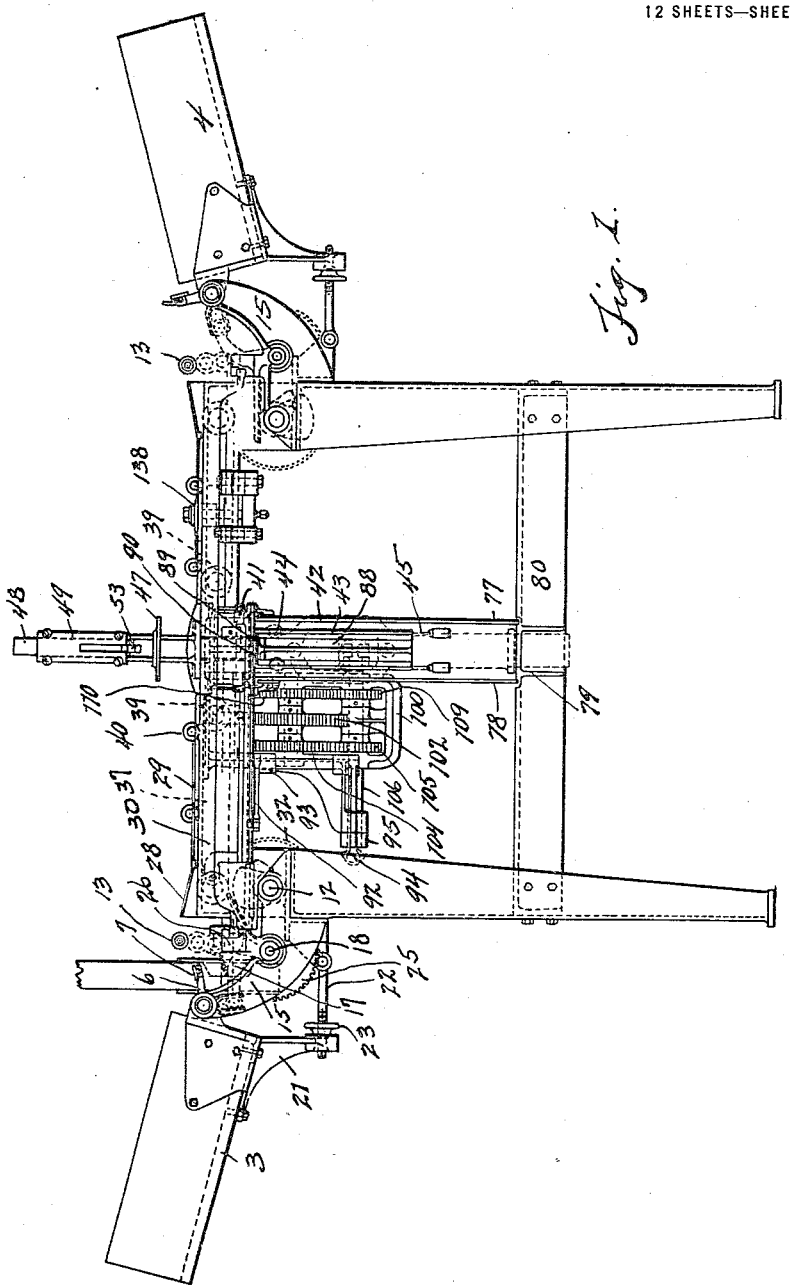
Figure 1 is a front elevation of a folding machine embodying our invention.
Figure 2:
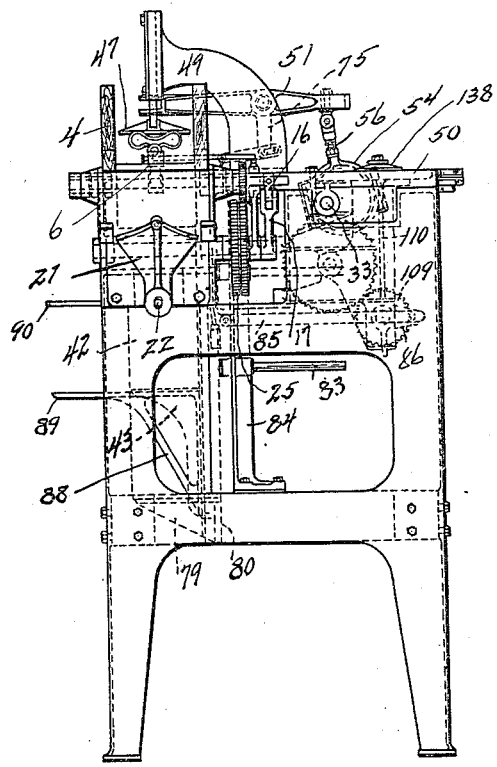
Fig. 2 is an end view thereof of the right hand side of Fig. 1.

The machine is of a type or character adapted to interfold previously formed sheets, as toilet paper or the like, or for interfolding envelops. The sheets or envelops to be folded, as is hereinafter shown, are provided in two stacks positioned on opposite sides of the machine and the mechanism involved is in three interrelated groups namely the feeding mechanism adapted to remove a sheet or envelop from each pack alternately and deliver the same to what I have termed the folding mechanism which forms a second group. The third group of coöperative parts, termed the delivery mechanism, is not only considered to involve the means for delivering the folded pack but also, includes the mechanism for cutting out a portion of the folded pack and for predetermining the number in the delivered pack.

So far as the folding operation is concerned, the feeding mechanism may be of any approved type adapted to feed the sheets or envelops singly and alternately from each stack. The preferred form of feeding mechanism, however, is shown in the accompanying drawings, more particularly in Fig. 4 in which a stack of sheets or envelops are indicated at 1 and 2 on opposite sides of the machine respectively. Each stack is carried in an inclined trough or way 3 or 4 adapted to feed downward toward the delivery end of the trough by gravity and to assist in the feeding of these stacks toward the delivery end of the trough, various means may be employed, as for instance, a sliding weight indicated by dotted lines at 5 in Fig. 4. The preferred mechanism for removing a sheet or envelop from the stack is a pivoted hollow arm 6 terminating at the free end in an apertured plate 7 adapted, on movement of the arm on its pivot, to contact the foremost sheet or envelop of the stack. At the time this apertured plate 7 contacts the face of the envelop, air is exhausted from the arm by means of a tube 8 communicating with the hollow interior thereof and connected with a pump indicated at 9, the piston 10 of which is connected with a crank 11 on the shaft 12. The position of the arm 6 when in contact with the pack is shown at the right hand end of Fig. 4. As the air is exhausted and the arm is turned on its pivot the end of the sheet or envelop is turned with the arm by reason of the vacuum produced and is inserted between a pair of rollers 13 and 14 running at a comparatively high rate of speed. As the envelop is inserted between the rollers, the piston of the pump starts on its down stroke releasing the vacuum and releasing the envelop from the arm. In the construction here shown the arm 6 is mounted on a shaft carried in bearings in brackets 15 at each end of the machine and connected with the arm 6, and extending at a right angle thereto is a slotted arm 16, in the slotted end of which rides a roller carried by the rock lever 17 in turn pivoted on the shaft 18 which is also mounted in the brackets 15. The rock arm 17 has an end 19 adapted to be contacted by a cam 20 on the shaft 12 and a spring (not here shown) is utilized as will be readily understood to hold the portion 19 in contact with the cam. As this cam rides to the position shown at the right side of Fig. 4, the arm 6 by action of the spring on the rock arm 17 is caused to turn on its axis and contact the bottom face of the sheet or envelop in the stack and, as this cam turns to position shown at the left side of Fig. 4, the arm is turned away from the stack by reason of the movement of the roller at the end of the rock arm 17 in the slot of the arm 16. The two cams 20 on opposite ends of the machine are operated in opposite relation as will be understood from the drawing so that, at the time one arm 6 contacts an envelop, the other arm 6 is delivering an envelop to its companion rollers 13 and 14.

The troughs 3 and 4, as will be understood more clearly from Fig. 1, are pivotally mounted on the brackets 15 at the respective ends of the machine and each trough is provided with a depending bracket 21 having an eye at the lower end for a bolt 22 pivoted to a bracket on the machine. The eye carries a nut 23 that threads on the end of the bolt by which means the trough 3 or 4 may be turned on the shaft of the arm 6 and the stack of envelops may be set at the desired angle parallel with the arm 6 when turned to contact the envelop.

Figure 3:
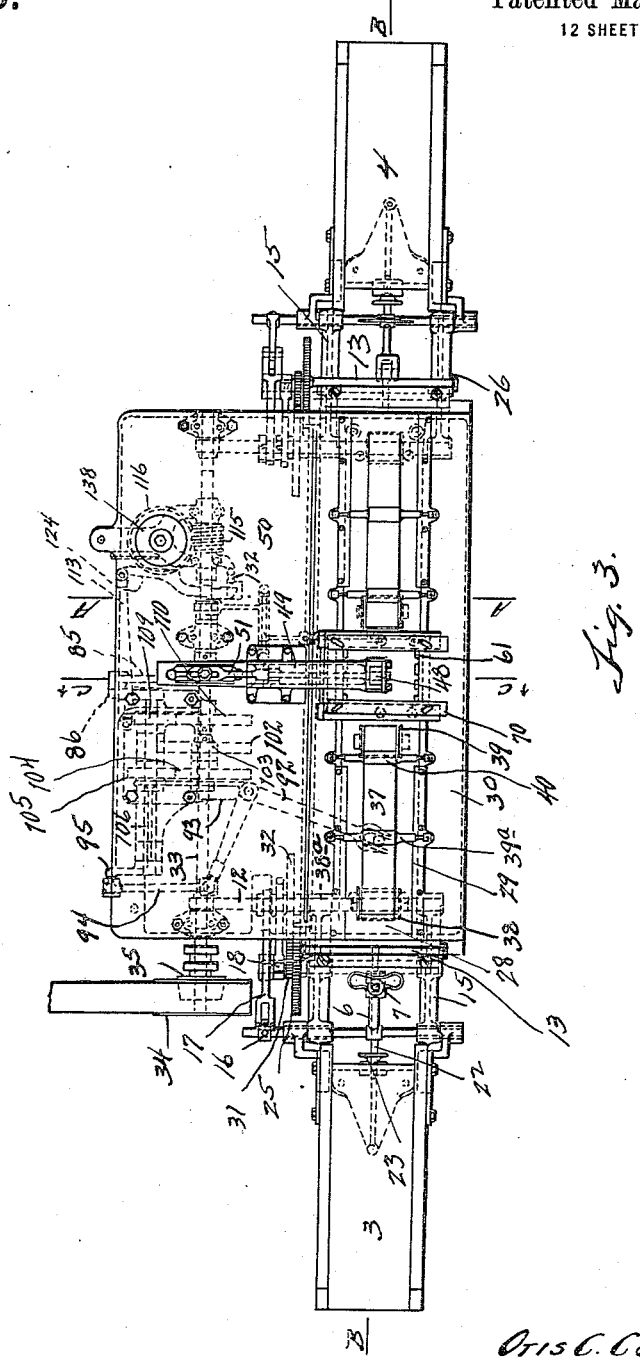
Fig. 3 is a plan view of the machine.

The rollers 13 and 14 are mounted for rotation in a bracket 26 and are provided with intermeshing gears so that they run continuously in opposite directions in contact one with the other. The roller gears are driven by the intermediate gear 24 carried by the bracket supporting the rollers 13 and 14. The gear 24 meshes with the gear 25 on the shaft 18. The bracket 26 supporting the rollers 13 and 14 and gear 24 is pivotally mounted on the shaft 18 on which the pivoted lever 17 is also mounted, and the gear 25 is loose thereon. When the lever 17 is rocked to turn the arm 6 to the position shown at the left of Fig. 4, the rollers 13 and 14 are thereafter brought to position to receive the end of the envelop or sheet by means of a cam 20 acting on the arm 26$^a$ of the roller bracket. By reason of the high speed of rotation of the rollers the sheet or envelop is projected into the mouth 28 of the guideway 29 on the table 30. The gear 25 is secured to the gear 31 on the shaft 18 which meshes with a gear 32 on the rotating shaft 12, which shaft, as will be understood from Fig. 3, is driven by means of a worm thereon meshing with a worm gear on the main shaft 33. This main shaft receives its power from the belt wheel 34 and the clutch mechanism 35 is utilized to connect the power with the machine.

The raceways 29 mounted on the upper side of the table 30 are each provided with a mouth 28 and the spaced channels 36 on opposite sides of the raceway as indicated in Fig. 5. These channels 36 are spaced a sufficient distance to allow free movement of the envelop or sheet down the raceway in which they are moved by means of the belt 37 running on the pulleys 38 and 39 at each end of each raceway. The belt pulley 38 and corresponding pulley in the opposite raceway is mounted on a shaft 38$^a$ driven by a gear engaging gear 32 on the shaft 12, as will be understood from Figs. 3 and 4.

The envelop is fed into the mouth of the raceway and onto the belt 37 and in order that the envelop or sheet may be held in frictional contact with the belt to move therewith rollers 39ª and 40 are provided riding in contact with the belt. By this means the envelop is positively fed to the delivery end of the raceway. The roller 39ª is also so positioned relative to the mouth thereof that, as the envelop is projected into the raceway by means of the rollers 13 and 14, it is engaged by the roller 39ª just after it is released by the rollers 13 and 14.

Figure 7:
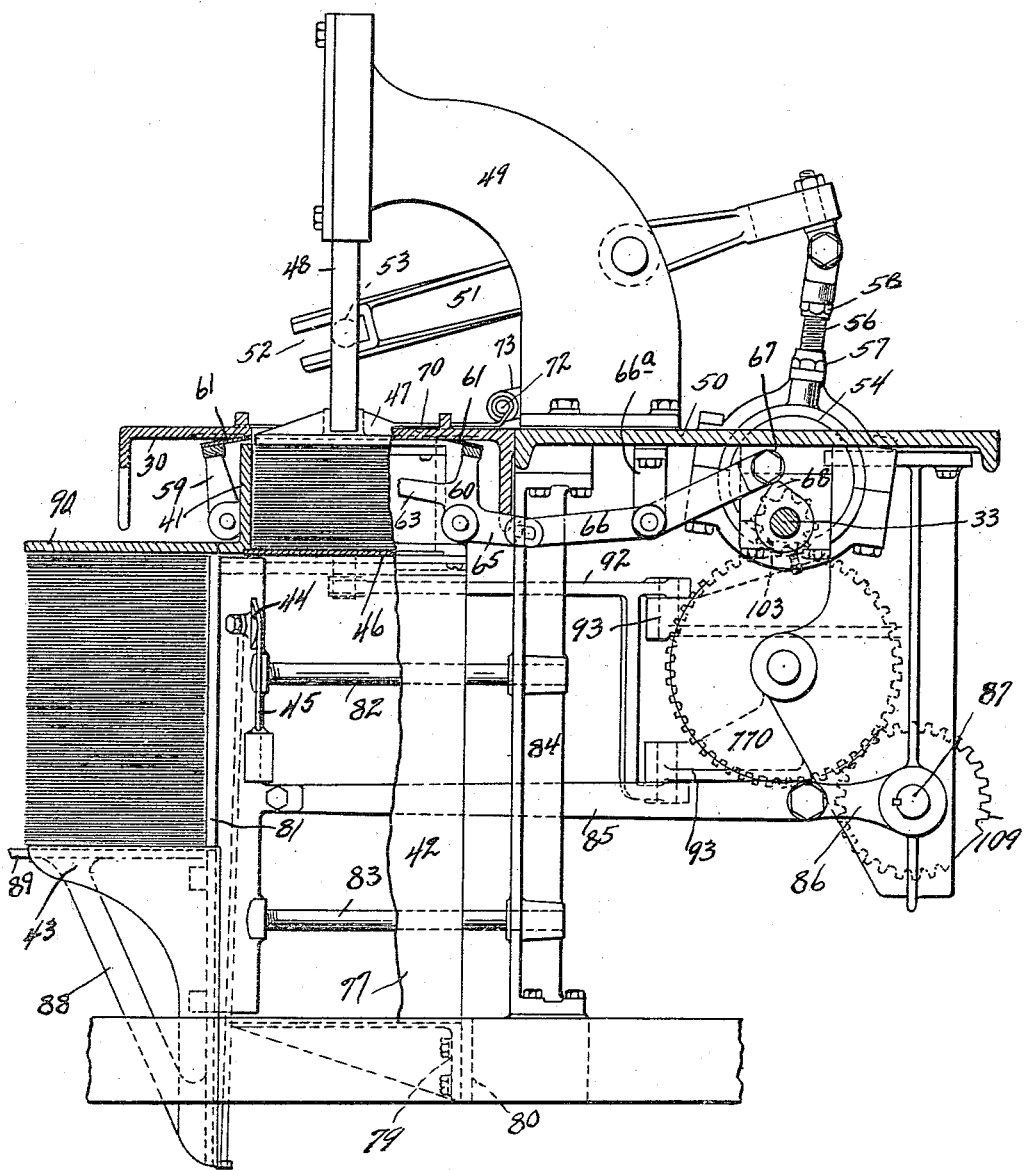
Fig. 7 is a similar view showing the folding mechanism in one of the positions assumed thereby and indicating the mode of delivery of an interfolded pack of envelops.

As heretofore stated this sheet feeding mechanism may be of various forms so far as the invention herein described is concerned and the particular form of sheet or envelop feeding mechanism above described forms the subject matter of a separate application for a United States patent, Serial No. 18,669, filed April 2, 1915, but is here described to make clear the mode of operation of the invention and of the manner in which envelops or sheets may be fed singly from the two stacks in alternate timed relation with the folding mechanism next to be described. The folding mechanism is shown more fully in Figs. 5 to 10 inclusive. In Figs. 5 and 7 it may be seen that the table 30 is provided with a central aperture rectangular in form beneath which is an open ended box like structure 41 to receive the folded envelops. Beneath this box like structure 41 is a receiver 42 slidable thereinunder. This receiver is of the same size in cross section as the aperture in the table and is provided with two side walls and a back wall leaving the front side and the upper end open so that as the envelops are folded they pass down into this receiver. A vertically slidable bottom member 43 is provided in the receiver and, as will be understood more clearly from Fig. 7, this bottom member is grooved to slide on the back wall of the receiver. This rear side of the receiver at the upper end is provided with pulleys 44 on opposite sides, as will be understood from Fig. 8, and weighted cords 45 running over these pulleys are attached to the lower end of this bottom member 43. These weighted cords 45 tend at all times to raise the bottom member 43 to the upper end of the receiver.

As the folded stack is formed and pressed down into the box 41 and receiver 42 this bottom member is depressed. When a sufficient quantity of folded sheets has been packed into the receiver, a knife 46 riding in ways at the bottom end of the box like structure 41 is moved to sever the stack at that point whereupon the receiver is moved forward by means of mechanism hereinafter described on the ways provided to the position shown in Fig. 7.

The folding operation is shown in its different stages in Figs. 8, 9 and 10. The aperture in the table 30 is slightly less than half the length of the envelop or sheet to be folded which is fed to position over the aperture by means of the belt 37 and the roller 40 riding thereon in the raceway 29 and each sheet, as it is fed to position over the aperture, is forced downwardly by means of a plunger 47, the stem 48 of which is vertically reciprocable in a bearing provided in the end of the bracket 49 which is fixedly supported on stationary frame part 50 at the rear of the table 30 as will be understood from Fig. 5. The stem is slotted to receive the slotted end of the arm 51 pivotally mounted on the bracket 49 and this slotted end 52 engages a roller 53 mounted in the slotted part of the stem 48. The arm 51 is rocked by means of an eccentric 54 on the shaft 33. This eccentric is adjustably connected with the rear end of this arm 51 by means of a threaded rod 56 pivotally connected with the end of the arm and provided with the adjusting nuts 57 and 58 on each end thereof by means of which the distance between the pivotal point of connection with the arm 51 and the center of the eccentric may be varied whereby the plunger may be varied in the position of its travel as may be required in folding sheets or envelops of different lengths, as is hereinafter noted.

The folding of the sheets is shown somewhat exaggerated in Fig. 13 in which it may be seen that a single sheet $a$ is folded about the ends of two adjacent sheets $b$ $c$ and that the sheets lie in alternate relation. That is, one sheet $a$ has the folded edge on one side and the sheets $b$ and $c$ having the two edges folded therebetween have the folded edges at the opposite side, etc. On examination of Fig. 13 it may be noted that the length of one part of the folded sheet from the end thereof to the point of bend is slightly less than the length of the remaining portion of that sheet, and this is true irrespective of which side of the sheet is first considered. The purpose of this arrangement is to allow sufficient length of bend to pass about the inserted parts of the interfolded sheets or envelops and leave the parallel portions of the inclosing sheet of substantially equal length. For this reason the aperture in the table 30 is slightly less in length than the length of half the sheet or envelop to be folded.

The folding operation is shown consecutively in Figs. 8, 9 and 10. In Fig. 8 the plunger 47 is shown as having passed down into the aperture forcing a portion of a previously placed sheet or envelop to place on top of the stack and leaving the remaining portion of slightly greater length extending in upright position substantially at a right angle to the inserted portion thereof. The plunger is then raised out of the aperture to a position substantially as shown by dotted lines in Fig. 8. Provision is made to hold the pack of folded sheets or envelops from springing upward out of the box like structure 41 beneath the aperture when the plunger is raised. The mechanism for so doing is shown more clearly in Figs. 5 and 6 and consists of the two rock arms 59 and 60 pivotally mounted on opposite sides of the box structure 41. The upper ends of these arms carry thin plates 61 insertible through apertures in each front and back wall of the box. To hold the stack in place in the box, these plates 61 are inserted thereover just before the plunger is raised. As will be understood from Fig. 3 these plates 61 have a notched edge and the front and back edge of the plunger is formed to correspond thereby allowing the plates 61 to be inserted over the top edge of the pack while the plunger is in position thereon and thus prevent the pack from following the plunger when the plunger rises. These rock arms 59 and 60 have arms 62 and 63 respectively, the arm 62 being provided with a pin 64 extending into a slot at the end of the arm 63 as will be understood from Fig. 6. The rock arm 60 also has an additional rearwardly extending slotted arm 65 engaging a pin on the rock lever 66 pivotally supported by a bracket 66ª on the frame portion 50 and provided with a roller 67 at the rear end riding on a cam 68 secured to the main shaft 33. As the high point of the cam 68 runs beneath the roller 67 the opposite end of the arm 66 is depressed rocking the arm 60 on its pivot and, by reason of the connection of the arms 62 and 63, correspondingly rocking the arm 59 in the opposite direction on its pivot and thus withdrawing both the plates 61 from engagement with the top of the pack. This operation is so timed that the plates 61 are withdrawn from the surface of the pack just as the plunger enters the aperture and thus the portion of the envelop being folded down into the aperture is placed in position on top of the pack without contacting the plates 61. The roller 67 rides off from the high point of the cam previous to the upward movement of the plunger whereupon the plates 61 are again inserted over the envelop or sheet just placed by reason of the action of a spring 69 connected with the lever 63.

As the plunger 47 rises to the position shown by dotted lines in Fig. 8, a slide member 70, one of which is placed on each of the opposite sides of the aperture opposite to the sides occupied by the plates 61, is moved over the upstanding portion of the introduced sheet or envelop forcing the same to assume the angular position shown in Fig. 9. As will be understood from Fig. 5 both these slide members are attached at the rear to a rod 72 and to this rod is connected the draw bar 73 having a slotted end 74. This slotted end 74 is positioned in the fork of the end of the arm 75 attached to the plunger operating arm as will be understood from Fig. 9. This arm 75 has a pin 76 riding in the slot. It is to be noted that the table 30 is recessed adjacent the aperture therein to receive these plates 70 so that the upper surface of the plate is not higher than the bottom of the raceway 29, and thus does not project into the path of movement of an envelop or sheet in passing to position over the aperture. Each recess for the sliding plates 70 is provided with pins which engage in the angularly positioned slots provided near each end of the plates whereby, upon movement of the plates transversely of the machine, these plates 70 are made to move longitudinally thereof to alternately project over the mouth of the aperture and be withdrawn therefrom. These plates, being loosely connected at the rear ends to the rod 72, may have a slight movement longitudinally of the machine as described and are simultaneously moved transversely of the machine by means of the draft bar 73 and rock arm 75. When the parts are in position shown in Fig. 5, the pin 76 engages the forward end of the slot 74 and forces the plates 70 transversely of the machine to engage the envelop and turn the same at an acute angle as indicated in Fig. 9.

At the time the projecting portion of the sheet or envelop has assumed the position shown in Fig. 9, a succeeding sheet or envelop has been forced to position over the aperture, the upwardly extending portion of the preceding sheet forming a stop therefor, as will be understood from the drawing. It will be noted that the roller 40 in the raceway 29 is positioned at such distance from the aperture that when, the sheet or envelop being inserted is brought to a stop by the upwardly extending portion of the previous sheet or envelop, the end thereof is still beneath the roller 40 which holds it in contact with the traveling belt 37. By this means the envelop being inserted is continuously forced to position in the bend of the preceding envelop or sheet and is held there until the plunger again enters the aperture.

In descending, as will be understood from Fig. 9, the plunger face contacts the upper end of the angularly positioned sheet and by reason of the angle of contact with the said projecting portion the angular portion of the envelop or sheet is forced down over the sheet being inserted by the roller 40 and belt 37. As the plunger descends, as will be seen on examination of Fig. 5, the pin 76 reaches the rear end of the slot 74 in the draft bar 73 and continued movement downward of the plunger withdraws the plates 70 from the position shown in Fig. 9 over the aperture, and this angularly positioned portion of the sheet or envelop will be folded over the inserted part of the next sheet or envelop. In so doing the end of the envelop being folded which lies in the delivery end of the raceway 29 is turned to upright position in the same manner as shown in Fig. 8, but upon the opposite side of the aperture in the table. As the plunger again rises, the plates 70 are drawn over the aperture and the last inserted sheet or envelop turned to an angle as indicated in Fig. 10. Thereupon the next succeeding sheet is inserted from the opposite stack on the right hand side of the machine in the same manner as previously described relative to the opposite stack and raceway.

By this described mechanism the sheets are interfolded and forced down into the box 41 and receiver 42 in a tightly packed stack.

As heretofore stated the receiver lies immediately below the box like member 41 and, as shown more particularly in Figs. 7 and 8, the receiver is formed of the parallel side walls 77 and 78 secured to the bottom of the box like member 41 and set into grooves in a bracket 79 secured to a cross member 80 of the frame work of the machine. These two walls form a channel and the back of the receiver is formed by the slidable member 81 hereafter termed the ejector. This ejector 81 is supported by the guide rods 82 and 83 slidable in bosses in the vertical member 84 at the back of the receiver, as will be understood from Fig. 7. Pivotally connected with this ejector 81 is a pitman 85 connected with a crank 86 on the shaft 87 operated in timed relation in a manner hereinafter described.

This ejector is provided on the front face adjacent the pack with means to allow the bottom member 43 to slide vertically thereon, as heretofore stated. Although not previously described the sliding bottom is really formed of two members, the member 43 having the general form shown in Figs. 7 and 8 and a member 88 having a portion 89 of considerable length extending in horizontal plane beneath the horizontal portion of the member 43 and one of the weighted cords 45 is attached to the member 43 at the bottom and the other of the weighted cords is attached to this second bottom bearing member 88 and the two are independently slidable on the ejector member 81. The box like portion 41 just beneath the aperture in the table 30 is also provided with a horizontal extension 90 extending outwardly from the machine, as will be understood from Fig. 7.

When the back member is in position between side members 77 and 78 of the receiver, the envelops are packed down onto the bottom member 43 and when the desired number of interfolded sheets or envelops has been packed down onto this bottom member a knife 46 riding in guides on the bottom of the box like member 41 is inserted through the pack, as will be understood from Fig. 8, cutting the portion therebelow from the part of the stack in the box 41. The crank 86 is then turned to move the ejector 81 to the position shown in Fig. 7. When in such position the pack is held between this horizontal portion 90 and the bottom member 43. The ejector is then retracted to the original position and by reason of the frictional contact of the pack with the member 90 at the upper end, the horizontal portion of the bottom member 43 will be drawn from beneath the stack thereupon, by reason of the weighted cord attached thereto, it will be drawn to the upper end of the receiver just beneath the knife 46. It is also to be understood that the knife 46, on severing the pack, remains beneath and forms a support for the remaining portion of the stack in the box 41, but on drawing the back member 81 to original position and the bottom member moving upward beneath the knife, the knife is retracted from beneath the stack which will then again rest on the bottom member 43.

At this time, however, the part 88, although having moved backward with the ejector 81 in the same manner as the portion 43, still has the portion 89, which is of a proper length for the purpose, extending beneath the stack which is then held between this part 89 and the part 90. From this position the stack may be removed by the operator, and upon removal of the stack this part 88 and 89 by means of the attached weighted cord 45 moves upward, beneath the part 43 in position for succeeding operations.

The knife 46 is operated by the rock arm 92 pivoted to brackets 93 at the rear of the machine and, as will be understood from Fig. 3, this arm 92 is operated by a pitman 94 connected with a crank 95 and the knife and ejector 81 of the receiver are timed to relatively operate as described by means of mutilated timing gears, and as is hereinafter more fully described the operation of these timing gears is controlled by a counting mechanism so that the knife is not operated until a certain desired quantity of envelops have been packed down into the receiver, and what has heretofore been termed the delivery mechanism consists of the ejector portion or back 81 of the receiver, the knife, the timing gears and the counting mechanism determining the time of operation thereof.

The mutilated gear group through which the knife and ejector are operated is mounted in a frame 100 below the table 50, as will be understood from Figs. 1, 3, 4, and 9, and consists of a shaft 101 having a gear 102 thereon continuously driven by the gear 103 on the main drive shaft 33. On this shaft 101 is also a gear 104 which, as is indicated in diagram in Fig. 14, has teeth only on substantially half the circumference.

This gear 104 meshes with a gear 105 on a shaft 106 carried in the lower part of the frame work 100. This gear 105 has a flat space 107 as shown in Fig. 14, and to the shaft 106 is attached the crank 95 for operating the knife 46.

By reason of the mutilated gear arrangement above described the gear 105 makes nearly a complete revolution during practically one-half revolution of the gear 104 and then remains idle during the remainder of the rotation of the gear 104. The shaft 106 terminates in the central box 107 and another shaft 87 in axial alinement with the shaft 106 is provided on the opposite side of the supporting frame 100. This shaft 87 carries a gear 109 exactly similar in size and mutilation with the gear 105. On the shaft 101 is a gear 110 exactly similar to the gear 104 and meshing with the gear 109. The gears 104 and 110 both have teeth only on about half their circumference as stated and are fixed on the shaft in a relation as hereinafter described. This shaft 87, as before described, operates the crank 86 in the end thereof which actuates the ejector. The ejector and knife thus operate in alternate relation, and the relative position of the gears 104 and 110 on the shaft 101 is such that the ejector will be operated during the time the knife 46 remains beneath the stack in the box 41, as has heretofore been stated—by which arrangement the folding operation may continue during the cutting out and ejection of a portion of the folded stack.

The operation of this mutilated gear group is controlled entirely by the counting mechanism shown in detail in Figs. 11, 12 and 15. From these views it will be understood that the gear 103 is loose on the shaft 33 and is provided on one side with one member 111 of a jaw clutch, the other member 112 of which is splined to the shaft and operated by means of a bell crank 113 pivoted beneath the rear part 50 of the table. By operation of this clutch member 111 and 112 the multilated gear group is operated and continuously operates during the period of engagement of the clutch members. At the time the clutches are disengaged the gears 104 and 105 occupy the position shown in Fig. 14, the gear 105 having yet to make one-half turn and the gear 104 a one-quarter turn to bring the mutilations into registration. With the gears in the position shown the crank operating the knife is in the retracted position. When the clutches are forced into engagement and the gears rotated the gear 105 makes a half revolution which forces the knife through the pack at which period the mutilations come into registration and the knife remains idle and the ejector gears 109 and 110 are rotated moving the ejector forward and backward. This turns the shaft 101 so that the gear 105 is again rotated retracting the knife whereupon the clutch members 111 and 112 are disengaged. The clutch members are drawn into engagement by means of the counting mechanism shown in Figs. 11 and 12 and the mutilated gears then perform the function described, whereupon the counting mechanism is automatically reset to throw the clutch after a predetermined number of revolutions of the main shaft and consequent operation of the plunger 47. This main shaft 33 is provided with a worm 115 meshing with a worm wheel 116 fixed to a vertical shaft carried in the rear part 50 of the table and the bracket 117 therebelow, as will be understood from Fig. 12. As shown more clearly in Fig. 15, a timing wheel 118 is loosely mounted relative to the worm wheel shaft and is provided with circularly arranged ratchet teeth 119 on the upper surface and similar ratchet teeth 120 on the lower surface thereof. A pawl 121 is pivotally supported in the worm wheel 116 extending upward through a notch therein and adapted to engage the teeth 120 on the lower side of the timing wheel. This pawl is loose on its pivot and tends to fall by gravity away from the teeth 120. An adjustable pin 122 extends upward through the lower part of the bracket 117 having an end adapted to engage the lower depending end of the pawl 121, as the pawl is brought to position thereover during revolution of the worm wheel. When the pawl is engaged by this pin the upper end thereof is held in engagement with a tooth on the timing wheel and, by reason of the length of the depending end 123 of the pawl, the timing wheel is moved forward one tooth till the end of the pawl drops from the end of the pin, whereupon the worm wheel makes another complete revolution and the timing wheel is moved another tooth. The worm wheel 116 and worm 115 may be of various relative sizes as may be desired, the relation being preferably in the neighborhood of fifty to one, so that, as the main shaft 33 makes fifty revolutions, the worm wheel 116 makes one revolution and moves the timing wheel one tooth forward.

To the long end of the bell crank 113 is pivotally attached the trip lever 124 having a projection 125 riding against the face of the timing wheel 118, as will be understood more fully from Fig. 11. This timing wheel has a notch 126 on its face, which when turned to position in registration with the part 125 of the lever allows the lever to turn on its pivot and the part 125 thereof enter the notch. It is to be noted that the projection 125 by reason of riding on the face of the timing wheel 118 during a portion of its revolution is held in the position shown by full lines in Fig. 11, and that the time of operation is fixed by the time required for the notch 126 to be brought to registration with the projection 125. This lever 124 also has an end extending over the shaft 33 and provided with notches 127 and 128. When the lever is moved by action of the spring 129, the notch 127 is brought into the path of movement of a pin 130 on the collar 131 rotating with the shaft 33. This draws the lever forward to position shown by dotted lines in Fig. 11 until the notch 128 engages the adjustable catch 132 carried on a part of the frame 117. This movement of the lever 124 throws the clutch members 111 and 112 into engagement and the lever 124 is held in the position shown by dotted lines with the portion 125 in the path of movement of a pin 133 secured to the worm wheel 116. It is to be noted that when the projection 125 engages in the notch 126 and the portion 127 is engaged by the pin 130, the lever 124 is brought forward to position shown by dotted lines in Fig. 11 withdrawing the projection from position in the notch. Thus the lever may remain in position as shown by dotted lines until the face of the projection 125 is engaged by the pin 133. When this pin engages the part 125 of the lever it moves the notched end 128 out of engagement with the catch 132 disengaging the clutches and restoring by action of the spring 128$^a$ the levers 113 and 124 to position shown by full lines in Fig. 11.

Above the timing wheel 118, as will be understood from Fig. 15, is a collar 134 having a circular groove 135 in the bottom end thereof in which groove is secured a pin 136. A pin 137 is also secured to the hub of the timing wheel engaging in the groove. The collar 134 is attached to a graduated disk 138 on the top of the rear part 50 of the table. This disk has several notches or apertures therein adapted to receive a spring-actuated pin 139 carried in a bracket fixed to the table. This collar 134 and disk 138 may be turned by the knurled head, as will be readily understood and the pin 139 set in the particular notch desired. For instance, consider it to set in notch No. 4. Now this setting of the disk moves the pin 136 carried in the groove in the collar a certain distance backward relative to the notch 126 in the face of the timing wheel. As shown by dotted lines in Fig. 15 the timing wheel is recessed on the lower surface to receive a spiral spring 118$^a$ which is wound by forward movement of the timing wheel by the pawl 121. If the graduated disk 138 was turned four points or notches backward the timing wheel would turn the same distance backward and require movement forward four notches to register with the part 125 of the lever 124 and the pawl 121 must necessarily move the wheel 118 four notches forward by the ratchet on the lower side. As the worm wheel makes only one turn to fifty revolutions of the shaft, and consequently fifty operations of the plunger 47, then to move the four notches, forward two hundred revolutions of the main shaft will have occurred. Consequently two hundred envelops have been folded down into the receiver. The notch 126 then receives the portion 125 of the lever allowing it to throw over, as heretofore stated, and operate the clutch members 111 and 112 driving the mutilated gear group. The envelops will then be severed by movement of the knife and delivered by the ejector, as heretofore described, and the parts are so related that this pin 133 on the worm wheel 116 disengages the lever 124 from the adjustable catch 132 on completion of the operation of the mutilated gears.

A pawl 140 is pivoted to the bracket 117 and engages the teeth 119 on the upper surface of the timing gear, as will be readily understood from the drawing. This prevents a backward movement of the timing wheel on its shaft by action of the spring, and to release this pawl, a properly shaped extension 141 is secured near the pivot point of the lever extending beneath the pawl 140 and, when this lever is thrown out by the pin 133, the extension 141 sweeps beneath the pawl raising it from engagement with the notches and releasing it to action by the spiral spring. This will reverse the rotation of the timing wheel carried thereby until it engages the pin 136 in the groove of the collar 134 whereupon the above described operation is repeated.

By this counting or control arrangement, folded stacks of equal quantity of envelops or sheets are automatically delivered without attention on the part of the operator. The device continues to count out the predetermined number of sheets and operation of interfolding succeeding envelops continues throughout the operation of the entire delivery mechanism.

It will be noted that, although the lever 124 is tripped by means of the pin 133 in the worm wheel 116, which is continuously revoluble, yet the part 125 of the lever is in the path of movement of the pin only when the lever is held by the latch 132. At all other times the worm wheel and pin rotate without engaging the lever.

From the foregoing description, it will be seen that the machine is practically entirely automatic in operation, the only requirement being that the trough or ways 3 and 4 be kept supplied with the material to be folded and that the folded stack be removed from the machine prior to the delivery of the succeeding stack by the ejector, and that the several objects of the invention are accomplished by mechanism that is comparatively simple and efficient for the purpose and of a character requiring but little or no thought on the part of the operator to keep in order.

What we claim and desire to secure by Letters Patent of the United States is—

1. In a folding machine for folding sheets, envelops, and the like, a table having an aperture, means for supporting a stack of sheets or envelops in opposite relation relative to the aperture, a receiver below the aperture, means for alternately removing a sheet or envelop from each stack, mechanism for delivering the removed sheets in alternate relation at the aperture, the aperture being substantially half the length of the sheet or envelop, a plunger movable into the aperture forcing a portion of the sheet or envelop thereinto and folding the remaining portion thereof to upright position, said upright portion of one sheet or envelop providing a stop for the succeeding sheet fed from the other stack, and means for folding said upright portion over the inserted sheet, said means operating in alternate relation with the plunger.

2. In a mechanism for interfolding sheets or envelops, a plate having an aperture substantially of the width of the sheet or envelop to be folded and substantially half the length thereof, means for delivering the sheets or envelops alternately to the aperture from opposite sides, a plunger for forcing the envelop into the aperture thereby folding a portion thereof to upright position, said upright portion providing a stop for the succeeding sheet, mechanism for folding the said upright portion of any sheet or envelop over the inserted portion of the succeeding envelop, the succeeding movement of the plunger completing the folding thereof, and folding a portion of the inserted sheet, a receiver for the folded envelops positioned beneath the aperture, and means for holding the stack of folded sheets or envelops during the time the plunger is out of engagement therewith.

3. In a mechanism for interfolding sheets or envelops, a plate having an aperture of a width substantially equal to that of the sheet or envelop to be folded and substantially half the length thereof, means for delivering sheets or envelops alternately to the aperture from opposite sides, a plunger for forcing the envelop into the aperture thereby folding a portion thereof to an upright position, the succeeding movement of the plunger folding the upright portion over a succeeding sheet whereby the folded sheets are interleaved, a receiver positioned beneath the aperture, means within said receiver for holding the interfolded sheets or envelops, mechanism for severing a pre-determined number of interfolded sheets from the remainder of the stack, and means for discharging the severed portion from the receiver.

4. In mechanism for interfolding sheets, envelops, and the like, a table having an aperture, means for supporting a stack of sheets or envelops on opposite sides of the aperture equidistantly spaced therefrom, a raceway for moving the sheet or envelop therein to the aperture, means for delivering the sheet or envelop from each stack alternately to the respective raceway, the aperture in the table being of a width substantially equal to that of the width of the sheet and substantially half the length thereof, a reciprocable plunger for forcing the sheet or envelop into the aperture thereby folding a portion thereof to upright position, the upright portion of each sheet providing a stop for the succeeding sheet, a receiver below the aperture into which the interfolded sheets are packed, mechanism for engaging over the upper end of the folded sheets to hold the same in the receiver during the time the plunger is out of engagement therewith, a cutting device for severing the folded stack, mechanism for discharging the severed portion from the receiver, counting mechanism by means of which the severing and discharging mechanism is controlled, the counting mechanism being adapted to be set to allow operation of the severing mechanism after a pre-determined number of folding operations.

5. In mechanism of the character described, a receiver means for interfolding sheets or envelops in a stack into the receiver, mechanism for severing the stack, mechanism for discharging the severed portion from the receiver, and a control device for the severing mechanism, the control device involving a means for setting the severing and discharging mechanisms into operation after each pre-determined number of folding operations and being adapted to be set for different numbers of folding operations.

6. In mechanism of the character described, a receiver, means for interfolding sheets or envelops in a stack into the receiver, a knife for severing the stack, mechanism for operating the knife, means for discharging the severed portion of the stack from the receiver, the knife operating and the discharging mechanism being operated in alternate relation, and a control device for said severing and discharging mechanisms adapted to allow operation of the same after each pre-determined number of folding operations, the control device being adapted to be set to provide for any desired number of folding operations between the periods of operation of the severing and discharge mechanisms.

7. In mechanism of the character described, position whereupon the severing mechanism is returned to original position, the control mechanism again setting the severing mechanism into operation after the succeeding pre-determined number of folding operations.

12. In a machine for folding sheets, envelops, or the like, a table or plate having an aperture less in length than the length of the sheet or envelop to be folded and substantially equal in width thereto, means for delivering a sheet or envelop alternately from opposite sides to the said aperture to position a portion of the sheet or envelop over the aperture, a plunger movable into the aperture forcing said portion of the sheet thereinto and folding the remaining portion thereof to upright position, the upright portion of one sheet providing a stop for the succeeding sheet from the opposite side, means for folding the upright portion of each sheet in sequence over the inserted sheet, a receiver into which the sheets are forced by movement of the plunger, and means within the receiver for holding the stack to form a bottom or support below the aperture against which the sheets may be folded.

13. In mechanism of the character described, a receiver, means for delivering sheets alternately from opposite sides to the receiver, means for interfolding sheets in a stack in the receiver, mechanism for severing the stack, discharge mechanism for discharging the severed portion, and means for operating the severing and discharging mechanisms comprising a pair of independently operable mutilated gears through the medium of which each of said mechanisms are operated respectively, the mutilations of the two gears being oppositely positioned to operate in timed relation, a pair of mutilated gears meshing respectively with the first named mutilated gears, said second gears being oppositely positioned and fixed to a common shaft for joint operation, a gear on said shaft, a main drive shaft for the machine, a gear loosely mounted on said main shaft, said gear on the main shaft carrying one member of a clutch, the other member being splined to the shaft, and a control mechanism for operating said splined member of the clutch adapted to throw the clutch into engagement after a pre-determined number of revolutions of the said main shaft, said control mechanism being adapted to be set to operate after any pre-determined number of operations of the shaft within the capacity of the device.

14. In a machine for folding sheets, envelops and the like, a table having an aperture less in length than the length of a sheet or envelop to be folded, means for supporting a stack of sheets or envelops on opposite sides respectively of the aperture, means for delivering a sheet from each stack alternately to the aperture, a plunger for forcing the envelop or sheet into the aperture to fold a portion thereof to upright position, the upright portion of one sheet providing a stop for the next succeeding sheet from the opposite stack, and means for folding the upright portion of each sheet in sequence over the inserted sheet.

15. In a machine for folding sheet, envelops and the like, a table or plate having an aperture less in length than the length of the sheet or envelop to be folded, means for delivering a sheet or envelop alternately from opposite sides to the said aperture, a plunger for forcing the envelop or sheet into the aperture to fold a portion thereof to upright position, the upright portion of one sheet providing a stop for the succeeding sheet from the opposite side, and means for folding the upright portion of each sheet in sequence over the inserted sheet.

16. In a machine for folding sheets, envelops and the like, a table having an aperture substantially half the length of the sheet or envelop and practically of a width equal thereto, means for delivering a sheet or envelop alternately from opposite sides to the aperture, a plunger movable into the aperture adapted to force a portion of the envelop thereinto and fold the remaining portion thereof to upright position, the upright portion of one sheet providing a stop for a succeeding sheet, means for partially folding the upright portion of each sheet in sequence over the inserted sheet whereby succeeding movement of the plunger completes the folding thereof over the inserted sheet and folds the remaining portion of the inserted sheet to upright position.

17. In mechanism of the character described, a table having an aperture, means for supporting a stack of sheets or envelops adjacent thereto upon opposite sides, mechanism for alternately delivering sheets or envelops from the opposite stacks to and over the aperture, the aperture being less in length than the length of the sheet, a plunger movable into the aperture adapted to force a portion of the sheet thereinto and fold the remaining portion to upright position providing a stop for the succeeding sheet, folders movable over the aperture on opposite sides thereof operating alternately with the plunger to partially fold the said upright portion of any sheet over the aperture, the succeeding movement of the plunger folding the said partially folded envelop over the end of the introduced envelop, and a receiver into which the folded envelops are forced by the plunger.

18. In a machine of the character described, a table having a central aperture less in length than the length of the sheet or envelop to be folded, a receiver therebelow, a table having an aperture, means for supporting a stack of sheets or envelops adjacent thereto upon opposite sides, mechanism for alternately delivering sheets or envelops from each stack to the aperture, the aperture being of a width substantially equal to that of the sheet or envelop to be folded and substantially half the length thereof, a reciprocable plunger for forcing a portion of the sheet into the aperture and thus folding a portion thereof to upright position, the upright portion providing a stop for the succeeding sheet whereby the sheets are interfolded, a receiver below the aperture to receive the interfolded stack, mechanism for folding the said upright portion over the inserted sheet, the succeeding movement of the plunger completing the folding thereof and folding a portion of the inserted sheet to upright position, means for holding the stack in the receiver during the interval the plunger is out of engagement therewith, said means operating in alternate relation with the plunger, mechanism for cutting out from the stack a pre-determining number of folded sheets or envelops, and mechanism for discharging the same from the receiver.

8. In mechanism of the character described, a receiver, folding mechanism for interfolding sheets in a stack in the receiver, the receiver having a fixed portion and a portion movable therefrom under, the movable portion having a vertically movable bottom member for supporting the stacks, a knife movable between the two portions to sever the stack in the movable part from the portion in the fixed part, the knife providing a support for the stack in the fixed part during the time the movable portion is being operated, the folding operation being continuous during operation of the severing mechanism, means for moving said movable portion, and a holder to which the stack in the movable portion is delivered by movement thereof.

9. In mechanism of the character described, a receiver, folding mechanism comprising a plunger reciprocable into and out of the mouth of the receiver, folding devices adjacent the said mouth adapted to fold over portions of the sheets operating in alternate relation with the plunger, the mouth of the receiver being of a width substantially equal to that of the sheet to be folded and of a length substantially equal to half the length of the sheet, means for delivering sheets to the mouth of the receiver in alternate relation on opposite sides, the plunger being adapted to force a portion of the sheet into the receiver and fold the remaining portion thereof to upright position, means for holding the stack in the receiver during the time the plunger is out of engagement therewith, the upright portion of a folded sheet providing a stop for a succeeding introduced sheet, the said folding devices operating to turn the upright portion of the inserted sheet and the succeeding downward movement of the plunger completing the folding thereof and also folding the portion of the inserted sheet to upright position.

10. In mechanism of the character described, a receiver, folding mechanism for interfolding sheets or envelops in a stack in the receiver, a knife for severing the stack, means for discharging the severed portion, a control mechanism for timing the operation of the severing and discharge mechanisms, the control device comprising a gear operated by the main drive shaft of the machine whereby the rotation thereof is in fixed relation with said main shaft, a loosely mounted timing wheel having a notched base, a loosely mounted pawl carried by the gear and adapted to be brought into engagement with a tooth of the timing wheel to move the timing wheel one notch for each revolution of the gear, a spring tending to return the timing wheel to normal position, a pawl for preventing the return of the timing wheel by action of the spring, a pin carried by the timing wheel, a graduated disk adapted to be set in various positions having a pin providing a stop for the pin of the timing wheel and determining the extent of backward rotation of said wheel by the spring, the said timing wheel also having a recess in the face thereof, a clutch for setting the severing and discharging mechanism into operation, a spring restrained lever having a portion adapted to engage the notch of the timing wheel, and also having a notched end, a pin on the main shaft adapted to engage the notch of the lever to move the same and throw the clutch into engagement, means for retaining the lever to hold the clutch in engagement and a pin on the gear adapted to disengage the lever upon completion of the operation of the severing mechanism.

11. In mechanism of the character described, a receiver, folding mechanism for interfolding sheets or envelops in a stack in the receiver, means for cutting out a portion of the stack, means for discharging the severed portion, the folding mechanism being continuous in its operation, and control mechanism for timing the operation of the severing and discharge mechanism, the control mechanism comprising a counting device adapted to be set to operate after a predetermined number of folding operations and mechanism connected therewith for setting the severing and discharge mechanism into operation, the severing and discharge mechanisms being automatically operated in alternate relation and so arranged that the severing mechanism first operates to sever the stack and remains idle during the discharge of the severed portion and the return of the discharge mechanism to original means for supporting a stack of sheets at opposite sides of the table respectively, a raceway extending from each of said means to the aperture, a traveling belt in each raceway, rollers riding on the said belt, there being a roller near each end of each raceway, a pair of high speed rollers between the raceway and the stack in each instance, means for removing a sheet or envelop from each stack alternately and delivering the same to the adjacent rollers, said rollers being adapted to deliver the removed sheet in each instance to the belt and roller of the adjacent raceway, the roller at the delivery end of the raceway in each instance being positioned a distance from the opposite side of the aperture less than the length of the sheet or envelop to be folded, a plunger for forcing a portion of a sheet into the aperture and thereby folding a portion thereof to upright position, said upright portion providing a stop for the sheet or envelop next introduced from the opposite raceway, the roller at the delivery end thereof and in each raceway respectively serving in conjunction with the companion belt to force the inserted sheet into the fold of the folded sheet, horizontally slidable plates mounted at the sides of the aperture adapted on movement to slide over the aperture and turn the upright portion over the inserted sheet and operating in alternate relation with the plunger and the succeeding movement of the plunger completing the fold and folding a portion of the inserted sheet to upright position in like manner as with the first, continued operation forming a stack of interfolded sheets in the receiver, fingers operating in alternate relation with the plunger extending over the top of the folded stack to hold the same on removal of the plunger and withdrawing therefrom as the plunger forces the new sheets into position, a knife for cutting out a portion of the interfolded stack, means for operating the knife at pre-determined intervals and means for discharging the severed portion from the receiver.

19. In a machine of the character described, a table having an aperture less in length than the length of the sheet to be folded, a raceway leading to the aperture from opposite sides, a traveling belt in each raceway, a roller riding on each belt near the delivery end of the raceway each positioned respectively from the opposite side of the aperture a distance less than the length of the sheet, means for delivering a sheet alternately to each raceway, a plunger for forcing a portion of the sheet into the aperture and folding a portion thereof to upright position, the upright portion providing a stop for a succeeding sheet and the roller and belt being adapted in each instance to force and hold the inserted sheet in the fold of the folded sheet, means operating in alternate relation with the plunger for turning the upright portion over the inserted sheet, the succeeding movement of the plunger completing the fold and turning the portion of the inserted sheet to upright position, a receiver into which the interfolded sheets are forced by the plunger, means for cutting out a portion of the folded stack, and means for discharging the cut out portion from the receiver.

In testimony whereof we sign this specification.

OTIS C. CURRIE.
WALTER A. GRUENBERG.

Copies of this patent may be obtained for five cents each, by addressing the "Commissioner of Patents, Washington, D. C."